UNITED STATES PATENT OFFICE.

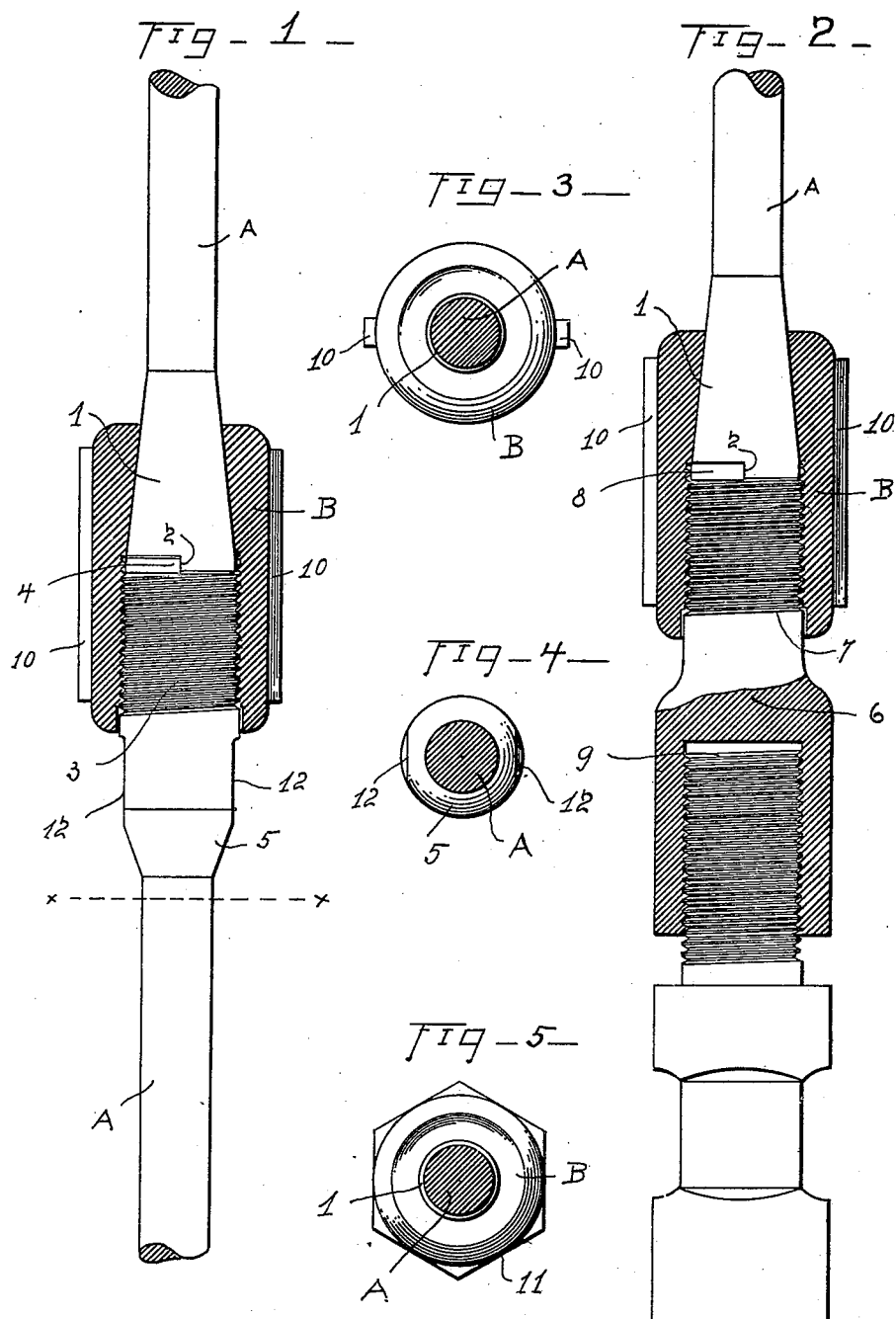

THEODORE C. MUNZ AND JOHN GIESEL, OF TOLEDO, OHIO.

ROD-COUPLING.

SPECIFICATION forming part of Letters Patent No. 666,771, dated January 29, 1901.

Application filed May 3, 1900. Serial No. 15,325. (No model.)

*To all whom it may concern:*

Be it known that we, THEODORE C. MUNZ and JOHN GIESEL, citizens of the United States, residing at Toledo, in the county of Lucas and State of Ohio, have invented a new and useful Improvement in Rod-Couplings, of which the following is a specification.

Our invention relates to improvements in rod-couplings, and has for its objects to provide a simple, economical, and durable rod-coupling, first, whereby rods may be readily and securely coupled or jointed together in continuous end-to-end contact in such manner as to relieve the couplings from the greater part of the strain of a longitudinal thrust or impact of the coupled rod; second, whereby the several rod-sections are locked against separate axial rotation, and thereby prevent the rod from becoming uncoupled by reason of greater axial resistance or friction at any part of the coupled rod, and, third, that may be adapted to be used with rods provided with other kinds of couplings. We attain these objects by providing each rod-section with a coupling-sleeve and upsetting the ends of the rod, as hereinafter described and illustrated in the drawings, wherein—

Figure 1 is a view of rods coupled in accordance with our invention, with the coupling-sleeve shown in longitudinal section. Fig. 2 shows our invention as adapted to other forms of rod-couplings. Fig. 3 is a top plan view of the coupling-sleeve. Fig. 4 shows a cross-section through line $x\ x$ of Fig. 1; and Fig. 5 is a similar view to Fig. 3, showing a hexagonal sleeve.

In the drawings, A is a coupling-rod section, and B is a coupling-sleeve movable thereon. Sleeve B is provided with an axial orifice, the diameter of which at one end is slightly greater than the diameter of the body portion of the rod A. Thence it enlarges cone-shaped for a distance, and for the remainder of its length is cylindrical, with that portion of the sleeve interiorly threaded.

One end of each sectional rod A after being inserted through the orifice of sleeve B from its conical end is enlarged by upsetting when heated to form a conical-shaped head 1, adapted to fit into the conical portion of the orifice of the sleeve and having the outer end diametrically stepped to form a shoulder 2. The other end of rod A is also enlarged by upsetting when heated to form an elongated cylindrical head 3, having its outer end diametrically stepped to form a shoulder 4 and connected by a conical neck 5 to the body portion of the rod. Head 3 is exteriorly threaded and of a diameter adapting it to threaded engagement with sleeve B.

Each rod-section A being thus formed and equipped with sleeves B, by adjusting to the head 1 of one section A head 3 of another section A, with the shoulders 2 and 4 abutted, sleeve B may be run down on the threaded portion of head 3 until the conical head 1 is drawn tightly within the conical portion of the sleeve-orifice, thereby coupling and locking both sections. It is apparent that being thus coupled they cannot be uncoupled by applying opposite rotative force to different rod-sections A and that one section cannot be rotated without rotating the other in the same direction. It is further apparent that the sections can only be uncoupled by holding the rod-sections against movement and rotating the sleeve B, or vice versa. It is further apparent that the heads of the sections A being so abutted the strain of a longitudinal thrust or impact of the coupled sections will be borne chiefly by the rods and not by the sleeve, thereby lessening the strain upon the sleeves B. It will also be apparent that by upsetting and enlarging the ends of rods A the coupling-joints will be thereby materially strengthened and rendered more durable.

As it is oftentimes desirable to make use of rods having other forms of couplings, we have provided a coupling 6, which may be substituted for head 3 of rod A. Coupling 6 is provided with a threaded portion 7 and with shoulders 8 at one end, by which it may be secured and coupled to the head 1 of a rod A, and at the other with an interiorly-threaded socket 9, adapted to threaded engagement with the particular form of rod-coupling desired to be used.

For convenience of tightening sleeve B may be outwardly provided with any convenient means of wrench attachment, as of flanges 10 in Figs. 1, 2, and 3, or with hexagonal sides 11, as in Fig. 5, and head 3, with parallel flattened surfaces 12, which when used in deep wells may be utilized for holding up the coupled rod-sections while other sections are being coupled on.

Having thus fully described our invention, what we claim to be new, and desire to secure by Letters Patent, is—

In a rod-coupling, the combination of a head formed on an end of one coupling-rod section by upsetting the end of the rod, the form of the head being a conical enlargement of the rod toward the end, and terminating in a short cylindrical portion having a diameter equal to that of the base of the cone, an elongated cylindrical head, of equal diameter with the cylindrical portion of the first head upset upon an end of another rod-section and exteriorly threaded, the heads each having equal longitudinal bisecting incuts in their outer ends, to form complementary semicylindrical projections, adapting the heads to overlapping abutment, and a sleeve, movably mounted on the first rod, interiorly adapted at one end to receive and closely fit the conical head, and to threaded engagement with the elongated head of the other rod-section, whereby, when the heads are in overlapped abutment, the sleeve may be run down in threaded engagement with the elongated head, until the heads of the rods are drawn together in rigid end-to-end abutment and locked against separate turning within the sleeve by their overlapping projections, substantially as shown and described, and for the purpose specified.

In witness whereof we have hereunto set our hands this 30th day of April, A. D. 1900.

THEODORE C. MUNZ.
JOHN GIESEL.

Witnesses:
ROBT. B. WILSON,
F. T. MACOMBER.